April 17, 1945.   R. M. OLIVER   2,374,036
VARIABLE LOAD BRAKE
Filed Jan. 27, 1943    2 Sheets-Sheet 2
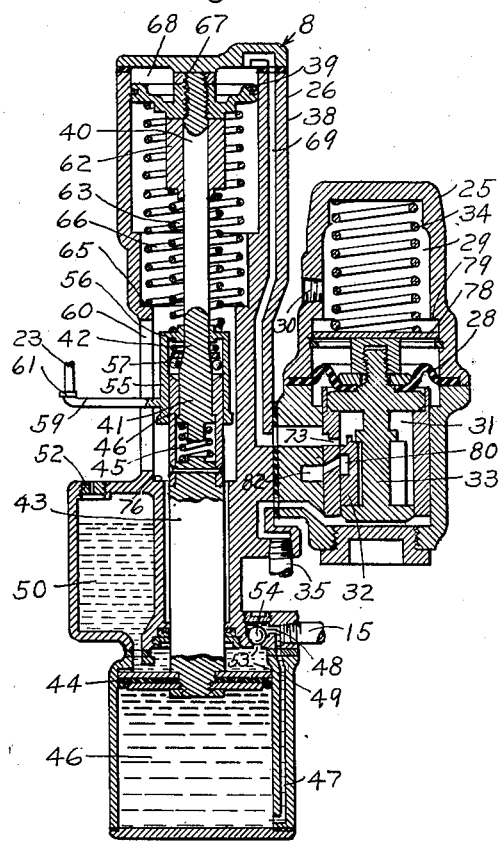
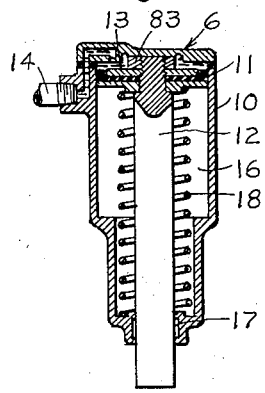
INVENTOR
ROBERT M. OLIVER
BY
ATTORNEY Patented Apr. 17, 1945

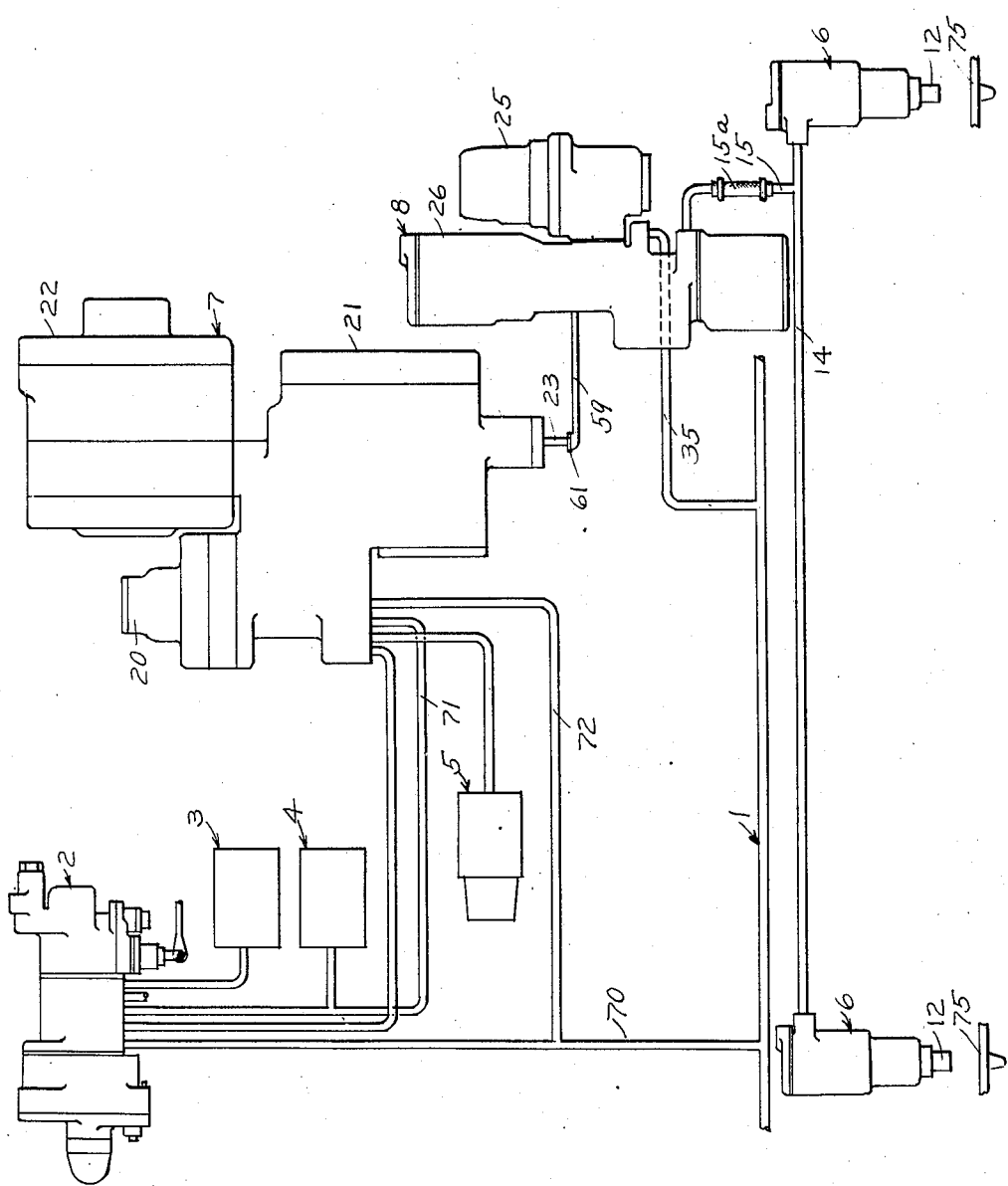

2,374,036

UNITED STATES PATENT OFFICE 2,374,036

VARIABLE LOAD BRAKE

Robert M. Oliver, Reno, Nev., assignor to The Westinghouse Air Brake Company, Wilmerding, Pa., a corporation of Pennsylvania Application January 27, 1943, Serial No. 473,722

11 Claims. (Cl. 303—22)

This invention relates to variable load brake equipment for vehicles, and more particularly to that type of equipment which is constructed and arranged to be automatically set or conditioned to vary the braking power according to the position the vehicle body assumes relative to a fixed part of a truck under varying loads.

The mechanism for conditioning the brake equipment may be carried by the vehicle body and in such cases is movable vertically therewith and is adapted to be controlled according to the position which the body assumes relative to a fixed part of the vehicle truck under varying loads.

It has heretofore been proposed to provide a strut cylinder mechanism which is carried by the truck or body bolster or any suitable spring supported member of the body or truck which is capable of movement relative to the truck side frame or other fixed part of the truck when the supporting springs are deflected as the result of an increase in load on the vehicle. This strut mechanism is constructed and arranged to cooperate with a stop member carried by a fixed or unsprung part of the truck to control the operation of the mechanism in accordance with the load carried by the vehicle.

In equipments of this type the strut cylinder mechanism operates upon relative movement between the sprung and unsprung member of the vehicle to measure the deflection of a given spring cluster, which relative movement is employed to condition the variable load valve device. Where a single variable load valve device mounted on the vehicle body is employed to control a single brake cylinder or any combination of brake cylinders for controlling all of the brakes on a truck, the deflection of any one spring cluster will not accurately indicate the load on the vehicle and therefore cannot be depended upon to properly control the brakes. One reason for this is that if the spring deflection is measured when the vehicle is on a curve, the spring on the inside of the vehicle is deflected more than the spring on the outside of the vehicle, and a false reading is obtained regardless of which spring is measured. Another reason for a false reading is that one spring cluster may have a materially different pick-up than its mate on the same truck.

It is therefore the principal object of the invention to provide for vehicle brakes improved variable control means which will be free of the above objectionable features and which will therefore accurately control the brakes according to the load carried by the vehicle.

Another object of the invention is to provide variable control means for vehicle brakes which is so constructed and arranged as to function under the influence of the action of both spring clusters on a truck under various degrees of load to condition the mechanism, that is to say, the control means will function to average the action of both spring clusters to provide the proper braking power for the weight carried by the vehicle.

Other objects and advantages will appear in the following detailed description of the invention.

In the accompanying drawings Fig. 1 is a diagrammatic view of a variable load brake equipment adapted to be controlled by the improved control means. Fig. 2 is an enlarged sectional view of the combined change-over control valve and strut mechanism shown in outline in Fig. 1. Fig. 3 is an enlarged sectional view of the measuring cylinder device shown in outline in Fig. 1.

Description

As shown in Fig. 1 of the accompanying drawings, the variable load fluid pressure brake equipment may comprise a brake pipe 1, a brake controlling valve device 2, an auxiliary reservoir 3, an emergency reservoir 4, a brake cylinder 5, a measuring cylinder device 6, one of which is disposed at each side of the truck, a variable load valve mechanism 7, and a combined change-over control valve and strut mechanism 8.

The brake controlling valve device 2 may be secured in any suitable manner to the vehicle body and as shown is of the "AB" type but may be of any other desired type. This controlling valve device may be of substantially the same construction and have the same operating characteristics as the "AB" valve device fully described in the patent to Clyde C. Farmer, No. 2,031,213 issued February 18, 1936, and in view of this it is deemed unnecessary to here show and describe the device in detail. It will of course be understood that this mechanism operates upon a service reduction in brake pipe pressure to supply fluid under pressure from the auxiliary reservoir to the brake cylinder to effect a service application of the brakes and operates upon an emergency reduction in brake pipe pressure to supply fluid under pressure from both the auxiliary and emergency reservoirs to the brake cylinder to effect an emergency application of the brakes, and further operates upon an increase in brake pipe pressure to effect a release of the brakes and the charging of the brake equipment.

The measuring cylinder device 6 at each side of the vehicle truck may comprise a verticalldisposed cylinder casing 10 which is rigidly secured in any suitable manner to the vehicle truck bolster (not shown) or any other suitable part of the vehicle which is supported by the truck springs. Contained in the cylinder casing is a piston 11 having a piston stem or rod 12. At one side of the piston 11 there is a chamber 13 which is in constant communication with a pipe 14, which pipe is connected to the combined change-over control valve and strut mechanism 8 by means of a pipe 15. The pipe 15 comprises two separate parts which are connected together by a flexible hose 15a, which hose accommodates relative movement between the vehicle body and truck. At the opposite side of the piston there is a chamber 16 through which the piston stem or rod 12 extends to the exterior of the casing 10. A suitable combined breather and lubricating pad 17 surrounds the rod 12 and is carried by the casing. This pad also prevents dust and other foreign matter from being drawn into the cylinders. Contained in chamber 16 and interposed between the piston and the inner wall of the casing is a spring 18 which, at all times, tends to move the piston and stem to their normal position, in which position they are shown in Figs. 1 and 3 of the drawings.

The variable load valve mechanism 7 is mounted on the vehicle body and as shown in outline in Fig. 1, may be the same as that fully shown, described and claimed in my pending application, Serial No. 469,807, filed December 22, 1942, now Patent No. 2,355,747, dated Aug. 15, 1944. In view of this the mechanism needs only be briefly described as comprising a brake cylinder cut-off portion 20, a limiting portion 21 and a reduction measuring portion 22.

Since the above mentioned portions of the variable load valve mechanism and their operation have been fully described in the above mentioned pending application it will here be understood that the valve device is conditioned in accordance with the load carried on the vehicle by adjustment of a rod 23 projecting from the casing of the limiting portion 21.

The combined change-over control valve and strut mechanism 8 may comprise a change-over control valve portion 25 and a strut mechanism portion 26 which are secured together in any suitable manner and which are preferably mounted on the vehicle body.

The change-over control valve portion 25 may comprise a casing in which there is mounted a flexible diaphragm 28, having at one side a chamber 29 which is constantly connected through a passage 30 with the atmosphere. At the opposite side of the diaphragm there is a valve chamber 31 containing a slide valve 32 which is adapted to be operated by a stem 33 operatively secured to the flexible diaphragm. Contained in chamber 29 is a spring 34, which, acting through the medium of a movable spring seat 78, at all times, tends to urge the diaphragm, stem and slide valve downwardly to the position in which it is shown in Fig. 2 of the drawings. The chamber 31 is in constant open communication with a pipe 35 which is connected to the brake pipe 1.

The strut mechanism portion 26 comprises a body portion 38 in which there is operatively mounted a piston 39 having a piston stem or rod 40. This stem or rod is provided with an enlarged lower end portion 41, a downwardly and outwardly tapering section 42 merging into the upper end of the enlarged portion as illustrated in the drawings.

The enlarged lower end portion 41 of the piston stem or rod is slidably mounted in the upper sleeve like end of a strut 43, which strut at its lower end is provided with a plunger 44.

Interposed between and operatively engaging the adjacent ends of the enlarged portion 41 of the piston stem and the strut is a spring 45 which normally maintains the strut spaced away from the lower end of the piston stem, there being a shoulder 46 formed on the upper sleeve like portion of the strut which engages with a shoulder formed on the enlarged end of the stem so as to maintain the strut connected to the piston stem.

At one side of plunger 44 there is a chamber 46 which is connected to pipe 15 by way of a passage 47 and a chamber 48. At the opposite side of the plunger there is a chamber 49 which is in constant open communication with a liquid supply chamber 50 provided with a filling plug 52 having formed therein a constantly open breather passage leading from the chamber to the atmosphere. The chamber 49 is also connected to chamber 48 by way of a passage 53 containing a ball check valve 54 which acts to prevent backflow of liquid from chamber 48 to chamber 49.

Slidably mounted on the sleeve portion of the strut is a sleeve member 55 having an upper wall 56 which is provided with a central opening through which the piston stem 40 extends, thus providing for relative movement between the member and piston stem. This upper wall 56 is spaced away from the upper end of the sleeve like portion of the strut and contained in this space are a plurality of locking elements in the form of balls 57 which are adapted to engage the inner surface of the sleeve member 55 and the tapering surface of section 42 of the piston stem to lock the stem and sleeve member together.

The sleeve member 55 is provided with a horizontally extending arm 59 which passes through a suitable slotted opening 60 in the body casing and at its outer end is provided with a part 61 which is adapted to engage the end of rod 23 projecting from the variable load valve mechanism 7.

Surrounding the piston stem or rod 40 and interposed between and operatively engaging a spring seat 62 provided on the stem 40 and the upper wall 56 of the sleeve member 55 is a spring 63 which tends, at all times, to urge the sleeve member in a direction away from the piston.

Surrounding the spring 63 and interposed between and operatively engaging the lower side of the piston 39 and a spring seat 65 provided in the casing is a spring 66 which tends, at all times, to urge the piston into engagement with a stop 67 disposed in a chamber 68 at the upper side of the piston. The chamber 68 is connected to a passage 69 leading to the seat for the slide valve 32 in the change-over portion 25.

Operation

Assuming the brake equipment to be depleted of fluid under pressure and the brake controlling valve device 2 to be in release or running position. Under these conditions the brakes on the vehicle will be released, the piston 11 and stem 12 of the measuring cylinder device 6 at each side of the truck will be in the position shown in Figs. 1 and 3 and the slide valve 32 of the change-over control portion 25 of the combined change-over control valve and strut mechanism 8 will be positioned as shown in Fig. 2 of the drawings.

It should here be mentioned that the chambers 50, 49, 46, and 48 in the strut mechanism, chamber 13 in the measuring cylinder 6, at each side of the truck, and all the connecting passages and pipes are initially filled with oil.

According to the invention the combined change-over and strut mechanism 8 together with the measuring cylinder device 6 at each side of the truck operate to condition the variable load valve mechanism 7, to vary the braking power in accordance with the load carried by the vehicle, when the equipment is being initially charged with fluid under pressure in a manner which will now be described.

In initially charging the brake equipment fluid under pressure supplied to the brake pipe 1 in the usual manner flows through a pipe 70 to the several chambers of the brake controlling valve device 2 which are to be charged and to the auxiliary and emergency reservoirs 3 and 4, respectively, in the usual manner. Fluid under pressure is supplied to the emergency reservoir 4 and to the variable load valve mechanism 7 by way of pipe 71, the flow of fluid to said mechanism charging the certain control chambers therein with fluid at emergency reservoir pressure. Fluid under pressure also flows from pipe 70 by way of a pipe 72 to the variable load valve mechanism 7 thus charging certain other control chambers with fluid at brake pipe pressure, all of which will be understood from an inspection of the aforementioned application Serial No. 469,807, filed December 22, 1942.

Fluid under pressure supplied to brake pipe 1 also flows to the valve chamber 31 of the change-over control valve portion 25 by way of pipe and passage 35, until a predetermined pressure has been built up in the valve chamber 31 for a reason presently described. With the slide valve 32 in the position shown, fluid under pressure flows from the valve chamber 31 to chamber 68 in the strut mechanism portion 8 by way of a port 73 in the seat for the slide valve 31 and connecting passage 69. An increase of pressure of fluid thus supplied to chamber 68 causes the piston 39 and attached stem 40 to move downwardly in opposition to the pressure of springs 63 and 66.

Since, at this time, the sleeve member 55 is locked to the stem 40 by means of the tapered section 42 on the stem and the balls 57, in a manner hereinafter described, the sleeve member 55 is also caused to move downwardly with the piston stem. As hereinbefore described the strut 43 is connected to the stem, so that downward movement of the stem causes the spring 45 and thereby the strut 43 and connected plunger 44 to move in the same direction.

Downward movement of the plunger 44 displaces the liquid in chamber 46 through passage 47 chamber 48 and pipes 15 and 14 to chambers 13 of the measuring cylinder devices 6 causing pistons 11 and attached stems 12 of said devices to move downwardly against the opposing pressures of springs 18. This downward movement of piston 11 and stem 12 continues until the outer end of the stem 12 engages a fixed stop 75 carried on an unsprung part of the vehicle truck, such for instance as the spring plank or side frame of the vehicle.

When the outer end of the rod or stem 12 engages the stop 75, the piston stem 12 and piston 11 of the measuring cylinder 6 at each side of the truck is brought to a stop so that the plunger 44 in the combined change-over control valve and strut mechanism is also brought to a stop.

With the plunger 44 and its attached stem 43 thus brought to a stop continued downward movement of the piston 39 and stem 40 causes spring 45 to be compressed, so that the stem moves relative to the strut 43 and sleeve member 55. Upon such relative movement the upper end of the sleeve like portion of the strut 43 engages the balls 57 causing the balls to move upwardly along the inwardly tapering section 42 of the stem thus disengaging the balls 57 from frictional engagement with the tapering section 42 of the stem and the inner wall of the sleeve member 55. As soon as the balls 57 are disengaged from the sleeve member 55, the pressure of spring 63, which has been compressed by previous relative movement between the piston stem and member, causes the member to move downwardly relative to the strut member 43 until the lower end thereof engages a stop shoulder 76 formed in the casing. If the lower end of the sleeve member 55 engages shoulder 76 before the piston 39 and stem 40 have completed their travel, the locking balls 57 will permit free movement of the stem relative to the sleeve member.

Now when the pressure of fluid in valve chamber 31 of the change-over control portion 25 of the combined change-over control valve and strut mechanism 8 has been increased to around 40 pounds, the diaphragm 28 will be caused to flex in an upwardly direction against the opposing pressure of spring 34. The diaphragm as it is thus flexed acts through the medium of the stem 33 to shift the slide valve 32 in the same direction. When the diaphragm is brought to a stop by means of a spring seat 78, carried by the stem 33, engaging a shoulder 79 provided in chamber 29 of the casing, the slide valve 32 will have been moved into a position in which a cavity 80 therein connects the port 73 in the seat for the slide valve with an atmosphere passage 82. With this communication established fluid under pressure in piston chamber 68 is quickly vented to the atmosphere by way of passage 69, port 73, cavity 80 in the slide valve 32 and atmospheric passage 82.

The reduction of pressure in chamber 68 resulting from the venting of fluid from this chamber permits spring 66 to act on the opposite side of the piston 39 to shift the piston and thereby stem 40 upwardly, spring 63 acting at this time to maintain the sleeve member 55 against upward movement, so that the piston 39 and stem 40 are permitted to move relative to both the strut 43 and the sleeve member 55. As the piston and stem continue to move in this direction relative to the sleeve member, the balls 57 by reason of the downwardly and outwardly tapering section 42 of the stem are forced into frictional locking engagement with the inner wall of the sleeve member 55. When this occurs continued movement of the piston 39 and stem 40 causes the sleeve member 55 to move in the same direction.

The initial movement of the piston 39 and stem 40 in an upward direction relative to the strut 43, permits the spring 45 to expand. As the piston and stem continue to move in this direction the shoulder on the stem is brought into engagement with the shoulder 46 on the upper sleeve like portion of the strut 43. When this occurs continued upward movement of the piston and stem causes the sleeve member 55 and strut 43 and thereby the plunger 44 to move in the same direction until the piston 39 is brought to a stop by engagement with the stop 67, in which position it will be maintained by spring 66.

Upon upward movement of the plunger 44 pressure on the liquid in chamber 46 and the piston chambers of the measuring cylinder devices 6 is relieved and as a result spring 18 acts to shift the piston 13 upwardly causing the oil in the piston chambers to be displaced into the chamber 46 of the combined change-over control valve and strut mechanism 8 by way of pipes 14 and 15, chamber 48 and passage 47.

The purpose of the liquid or oil supply chamber 50 is, in the case of leakage to replenish the liquid or oil supply in chamber 46 of the strut mechanism 8, chambers 13 in the measuring cylinders 6 and all connecting passages and pipes so as to maintain continuity of the fluid link between chamber 46 and the chambers 13. This volume of liquid also serves to prevent a partial vacuum from being created in chamber 49 when the plunger 44 is moved downwardly and serves to prevent the liquid from interfering with the plunger as it is moved upwardly.

When for any reason it is necessary to replenish the liquid or oil supply in chamber 46 in the strut mechanism and the chambers 13 in the measuring cylinders, oil flows to said chambers from the supply chamber 50 by way of chamber 49, past ball check valve 54, chamber 48 and passages 47 and pipe 15 to chambers 46 and 13, respectively.

The purpose of the ball check valve 54 is to prevent back flow of liquid or oil from chamber 48 and connected chambers 46 and 13 to chamber 49 when the plunger 44 is operated to displace liquid or oil in chamber 46 in the manner hereinbefore described.

As the sleeve member 55 is moved upwardly the rod 23 projecting from the variable load valve mechanism 7 is moved in the same direction through the medium of foot 61 and horizontally disposed arm 59 carried by the sleeve. When the piston 39 is brought to a stop in the manner just described the upward movement of the sleeve member 55 and thus the rod 23 is brought to a stop thereby conditioning or setting the variable load valve mechanism 7 in accordance with the average truck spring deflection.

It will be understood that the operation of the change-over mechanism to condition the fluid pressure brake equipment for either light or heavy braking will be identical with that of the corresponding mechanism disclosed in the aforementioned pending application and for this reason only those parts of the mechanism which are under control of the combined change-over and strut mechanism have been described.

Now when a reduction in brake pipe pressure is effected the brake equipment will function in the same manner as described in the aforementioned pending application to supply fluid under pressure to the brake cylinder to effect the desired application.

It will be understood that with the brake equipment conditioned for either light or heavy braking the release of the brakes will be accomplished in the same manner as described in said pending application.

Having now described my invention, what I claim as new and desire to secure by Letters Patent, is:

1. In a fluid pressure brake apparatus, the combination, with means for limiting the braking power of the vehicle, said means being adjustable to provide different degrees of braking power, of means for adjusting said means according to the weight of the lading on the vehicle, the adjusting means comprising a hydraulic mechanism responsive to fluid under pressure supplied thereto for measuring the relative movement between the vehicle body and the vehicle truck due to variations in the weight of the lading on the body, and fluid pressure responsive means for controlling the supply of fluid under pressure to and release of fluid under pressure from said hydraulic mechanism.

2. In a fluid pressure brake apparatus, the combination, with means for limiting the braking power of the vehicle, said means being adjustable to provide different degrees of braking power, of means for adjusting said means according to the weight of the lading on the vehicle, the adjusting means comprising a hydraulically operated measuring device responsive to liquid supplied thereto for measuring the relative movement between the vehicle body and the vehicle truck due to variation in the weight of the lading on the body, and fluid pressure responsive means for effecting and controlling the flow of liquid to and from said hydraulically operated measuring device.

3. In a fluid pressure brake apparatus, the combination, with means for limiting the braking power of the vehicle, said means being adjustable to provide different degrees of braking power, of means for adjusting said means according to the weight of the lading on the vehicle, the adjusting means comprising a hydraulically operated measuring device for measuring the relative movement between the vehicle body and the vehicle truck due to variations in the weight of the lading on the body, a plunger mechanism responsive to an increase in the pressure of fluid supplied thereto for supplying liquid to said hydraulically operated measuring device and responsive to a reduction in fluid pressure acting thereon for releasing liquid from said hydraulically operated measuring device, and fluid pressure responsive means for controlling the supply of fluid under pressure to and the release of fluid under pressure from said plunger mechanism.

4. In a fluid pressure brake apparatus, the combination, with means for limiting the braking power of the vehicle, said means being adjustable to provide different degrees of braking power, of means for adjusting said means according to the weight of the lading on the vehicle comprising a hydraulically operated measuring device for measuring the relative movement between the vehicle body and the vehicle truck due to variations in the weight of the lading on the body, a chamber normally filled with a liquid, a plunger operative to supply liquid from said chamber to said hydraulically operated measuring device, and fluid pressure responsive means for controlling said plunger.

5. In a fluid pressure brake apparatus, the combination, with means for limiting the braking power of the vehicle, said means being adjustable to provide different degrees of braking power, of means for adjusting said means according to the weight of the lading on the vehicle, the adjusting means comprising a hydraulically operated measuring device having a movable abutment responsive to the force of a liquid supplied thereto for measuring relative movement between the vehicle body and the vehicle truck due to variations in the weight of the lading on the body, a chamber normally filled with liquid, and fluid pressure responsive means for controlling the supply of liquid from said chamber to said movable abutment.

6. In a fluid pressure brake apparatus, the combination, with means for limiting the braking power of the vehicle, said means being adjustable to provide different degrees of braking power, of means for adjusting said means according to the weight of the lading on the vehicle, the adjusting means comprising hydraulically operated mechanism for measuring the relative movement between the vehicle body and the vehicle truck due to variations in the weight of the lading on the body, and fluid pressure responsive means including a movable abutment subject to the pressure of fluid in a chamber and a spring operative for controlling said hydraulically operated mechanism.

7. In a fluid pressure brake apparatus, the combination, with means for limiting the braking power of the vehicle, said means being adjustable to provide different degrees of braking power, of means for adjusting said means according to the weight of the lading on the vehicle, the adjusting means comprising a hydraulically operated measuring device responsive to the force of a liquid supplied thereto for measuring the relative movement between the vehicle body and the vehicle truck due to variations in the weight of the lading on the body, a movable abutment responsive to the pressure of fluid supplied thereto for displacing liquid from a supply chamber to said measuring device, and fluid pressure responsive means for controlling the supply of fluid under pressure to said movable abutment.

8. In a fluid pressure brake apparatus, the combination, with means for limiting the braking power of the vehicle, said means being adjustable to provide different degrees of braking power, of an adjustable member for adjusting said means according to the weight of the lading on the vehicle, a fluid pressure responsive hydraulically operated mechanism for conditioning said adjustable member according to the relative movement between the vehicle body and the vehicle truck due to variation in the weight of the lading on the body, and locking means movable into frictional locking engagement with said adjustable member for maintaining said member in its adjusted position.

9. In a variable load brake apparatus for a vehicle, the combination, with means for adjusting the braking power according to the load on the vehicle, of a slidably mounted member included in said means adjustable according to the lading on the vehicle, locking means movable into locking engagement with said slidably mounted member for locking same in an adjusted position and movable out of locking engagement to permit the adjustment of same, and a fluid pressure responsive hydraulically governed mechanism for adjusting said member, and for controlling the operation of said locking means.

10. In a variable load fluid pressure brake of the type having a brake pipe, the combination, with means for limiting the braking power of the vehicle, said means being adjustable to provide different degrees of braking power, of means for adjusting said means according to the weight of the lading on the vehicle, the adjusting means comprising a hydraulically operated measuring device responsive to the force of a liquid supplied thereto for measuring the relative movement between the vehicle body and the vehicle truck due to variations in the weight of the lading on the body, a movable abutment responsive to the pressure of fluid supplied thereto for causing said liquid to be supplied to said hydraulically operated measuring device, and means operated when the pressure in said brake pipe is below a chosen valve for supplying fluid under pressure to said movable abutment.

11. In a fluid pressure brake apparatus, the combination, with means for limiting the braking power of the vehicle, said means being adjustable to provide different degrees of braking power, of means for adjusting said means according to the weight of the lading on the vehicle comprising a plurality of hydraulically operated measuring devices, each having a movable abutment subject to the pressure of a liquid in a chamber and the opposing pressure of a spring for measuring the relative movement between the vehicle body and the vehicle truck due to variations in the weight of the lading on the body, a plunger mechanism responsive to an increase in the pressure of fluid for supplying the liquid to both hydraulically operated measuring devices and responsive to a reduction in pressure of fluid therein for releasing the liquid from the chambers in both hydraulically operated measuring devices, a brake pipe normally charged with fluid under pressure, and means responsive to pressure of fluid in said brake pipe and operative when the pressure of fluid in the brake pipe is less than a chosen degree for supplying fluid under pressure to said plunger mechanism and operative when the pressure of fluid in the brake pipe is above said chosen degree for releasing fluid under pressure from said plunger mechanism.

ROBERT M. OLIVER.